US012730180B2

(12) United States Patent
Zhou et al.

(10) Patent No.: US 12,730,180 B2
(45) Date of Patent: Sep. 8, 2026

(54) RANGING METHOD AND APPARATUS

(71) Applicant: HUAWEI TECHNOLOGIES CO., LTD., Shenzhen (CN)

(72) Inventors: Baojian Zhou, Shenzhen (CN); Jiajin Luo, Shenzhen (CN); Xiaohui Peng, Shenzhen (CN); Xiaoyue Hou, Shenzhen (CN); Chenchen Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 18/517,770

(22) Filed: Nov. 22, 2023

(65) Prior Publication Data

US 2024/0111017 A1 Apr. 4, 2024

Related U.S. Application Data

(63) Continuation of application No. PCT/CN2022/090952, filed on May 5, 2022.

(30) Foreign Application Priority Data

May 28, 2021 (CN) ........................ 202110591894.6

(51) Int. Cl.
*G01S 5/08* (2006.01)
*G01S 13/30* (2006.01)

(52) U.S. Cl.
CPC ................ *G01S 5/08* (2013.01); *G01S 13/30* (2013.01)

(58) Field of Classification Search
CPC .......... G01S 13/84; G01S 5/00; G01S 13/781; G01S 13/30; G01S 5/08; G01S 13/765; H04W 72/044
See application file for complete search history.

(56) References Cited

U.S. PATENT DOCUMENTS 5,801,818 A * 9/1998 Corrigan ................ G01B 11/02 356/73.1
8,644,768 B2 * 2/2014 Kluge ..................... G01S 11/02 455/67.14
2008/0150699 A1 * 6/2008 Ohara .................... H04B 17/27 340/10.4
2018/0136309 A1 * 5/2018 Lo Monte ............. G01S 5/0231
2020/0296614 A1 * 9/2020 Lee ..................... H04W 64/006

* cited by examiner

*Primary Examiner* — Mirza F Alam
(74) *Attorney, Agent, or Firm* — Rimon PC

(57) ABSTRACT

A ranging method and apparatus are provided. In the method, a transmit end receives a first ranging parameter from a receive end, where the first ranging parameter is received in an $N^{th}$ time of ranging, and the first ranging parameter includes first ranging precision of a ranging signal and/or a first signal-to-noise ratio of the ranging signal. The transmit end determines a first ranging waveform based on the first ranging parameter. The transmit end sends the first ranging waveform to the receive end. The transmit end receives a second ranging parameter from the receive end, where the second ranging parameter is determined based on the first ranging waveform, the second ranging parameter includes second ranging precision of the ranging signal and/or a second signal-to-noise ratio of the ranging signal, and the second ranging precision is less than the first ranging precision.

18 Claims, 8 Drawing Sheets

Method 300

Step S310: A transmit end receives a first ranging parameter from a receive end, where the first ranging parameter is received in an $N^{th}$ time of ranging, the first ranging parameter includes first ranging precision of a ranging signal and/or a first signal-to-noise ratio of the ranging signal, and N is an integer greater than 0

Step S320: The transmit end determines a first ranging waveform based on the first ranging parameter Step S330: The transmit end sends the first ranging waveform to the receive end Step S340: The transmit end receives a second ranging parameter from the receive end, where the second ranging parameter is determined based on the first ranging waveform, the second ranging parameter includes second ranging precision of the ranging signal and/or a second signal-to-noise ratio of the ranging signal, and the second ranging precision is less than the first ranging precision Step S350: When a value of the second ranging parameter does not meet a threshold of a system, the transmit end performs an $(N+1)^{th}$ time of ranging, or when a value of the second ranging parameter meets a threshold of a system, the transmit end ends ranging Method 300

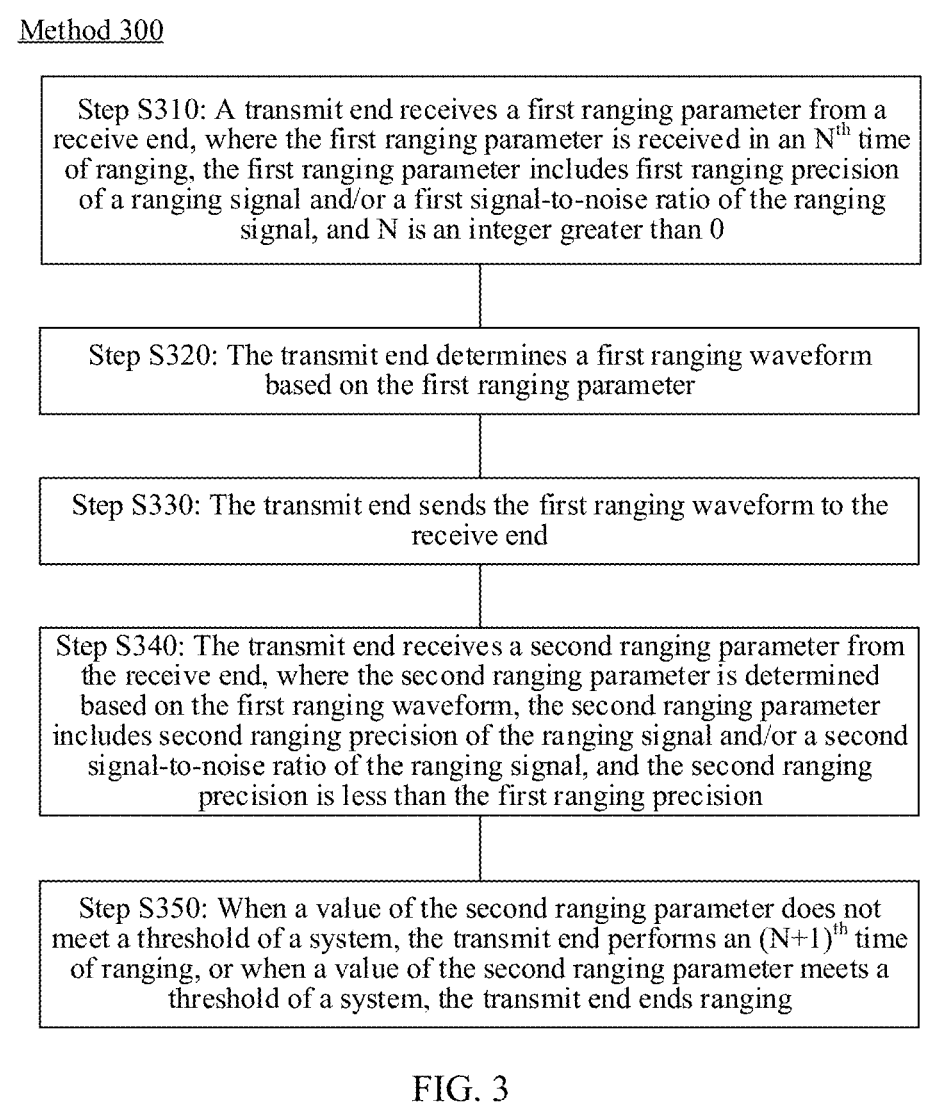

Step S310: A transmit end receives a first ranging parameter from a receive end, where the first ranging parameter is received in an $N^{th}$ time of ranging, the first ranging parameter includes first ranging precision of a ranging signal and/or a first signal-to-noise ratio of the ranging signal, and N is an integer greater than 0

Step S320: The transmit end determines a first ranging waveform based on the first ranging parameter Step S330: The transmit end sends the first ranging waveform to the receive end Step S340: The transmit end receives a second ranging parameter from the receive end, where the second ranging parameter is determined based on the first ranging waveform, the second ranging parameter includes second ranging precision of the ranging signal and/or a second signal-to-noise ratio of the ranging signal, and the second ranging precision is less than the first ranging precision Step S350: When a value of the second ranging parameter does not meet a threshold of a system, the transmit end performs an $(N+1)^{th}$ time of ranging, or when a value of the second ranging parameter meets a threshold of a system, the transmit end ends ranging

FIG. 3

RANGING METHOD AND APPARATUS

CROSS-REFERENCE TO RELATED APPLICATIONS

This application is a continuation of International Application No. PCT/CN2022/090952, filed on May 5, 2022, which claims priority to Chinese Patent Application 202110591894.6, filed on May 28, 2021. The disclosures of the aforementioned applications are hereby incorporated by reference in their entireties.

TECHNICAL FIELD

This application relates to the communication field, and more specifically, to a ranging method and apparatus.

BACKGROUND

Currently, ranging may be performed based on a phase of a received signal. A ranging signal may be a single-carrier signal, a dual-carrier signal, or a signal including a plurality of subcarriers, for example, an orthogonal frequency division multiplexing (OFDM) signal. However, phase-based ranging has an ambiguity problem. For one observation value, there are a plurality of phase ambiguity points, and a spacing between the phase ambiguity points is $2\pi$. Phase ambiguity results in distance ambiguity, to be specific, one observation distance corresponds to a plurality of potential true distances.

Currently, in phase-based ranging, to support unambiguous ranging over a large-distance range, frequency spacings of carriers are required to be small, resulting in a reduction of ranging precision. Currently, a ranging range conflicts with the ranging precision.

Therefore, how to improve the ranging precision while avoiding the distance ambiguity has become a technical problem to be resolved.

SUMMARY

This application provides a ranging method and apparatus, to implement high-precision ranging while avoiding distance ambiguity through multi-stage ranging.

According to a first aspect, a ranging method is provided. The method includes: A transmit end receives a first ranging parameter from a receive end. The first ranging parameter is received in an $N^{th}$ time of ranging. The first ranging parameter includes first ranging precision of a ranging signal and/or a first signal-to-noise ratio of the ranging signal. The transmit end determines a first ranging waveform based on the first ranging parameter. The transmit end sends the first ranging waveform to the receive end. The transmit end receives a second ranging parameter from the receive end. The second ranging parameter is determined based on the first ranging waveform. The second ranging parameter includes second ranging precision of the ranging signal and/or a second signal-to-noise ratio of the ranging signal. The second ranging precision is less than the first ranging precision. When a value of the second ranging parameter does not meet a threshold of a system, the transmit end performs an $(N+1)^{th}$ time of ranging. Alternatively, when a value of the second ranging parameter meets a threshold of a system, the transmit end ends ranging. N is an integer greater than 0.

Based on the foregoing technical solution, in this application, the receive end implements high-precision ranging while avoiding distance ambiguity through multi-stage ranging.

It should be noted that, in this application, the transmit end may be a network device (for example, a base station) or may be a terminal device (for example, user equipment).

It should be noted that, in this application, a ranging parameter may be used to determine ranging precision. In other words, the ranging parameter mentioned in this application includes but is not limited to the ranging precision and a signal-to-noise ratio, and may also include another ranging parameter. Any ranging precision that can be determined (or may be understood as obtained) by using these parameters falls within the protection scope of this application.

With reference to the first aspect, in some implementations of the first aspect, that the transmit end determines a first ranging waveform based on the first ranging parameter includes: The transmit end determines a first distance of the ranging signal based on the first ranging parameter. The transmit end generates the first ranging waveform based on a type of the ranging signal and the first distance.

In this application, the ranging signal may be of a single-carrier type, a dual-carrier type, or a multi-carrier type. The type of the ranging signal is not limited in this application.

In this application, the bandwidth of the ranging signal may be obtained based on the type of the ranging signal and the first distance, to generate a ranging waveform, and perform ranging on the transmit end and the receive end.

It should be understood that, if the ranging waveform cannot be generated due to a limitation of a system specification, the ranging procedure is ended. For example, a case in which the ranging waveform cannot be generated includes: A frequency of a single-carrier signal reaches a system capability limit; a frequency difference of a dual-carrier signal reaches a system capability limit; or the bandwidth of a multi-carrier signal reaches a system capability limit. In this case, the transmit end may end the ranging.

With reference to the first aspect, in some implementations of the first aspect, when the first ranging parameter is a first signal-to-noise ratio, that the transmit end determines a first distance of the ranging signal based on the first ranging parameter includes: The transmit end determines the first ranging precision based on the first signal-to-noise ratio. The transmit end determines the first distance of the ranging signal based on the first ranging precision.

It should be noted that, in this application, the first distance may be an integer multiple of the first ranging precision.

Based on the foregoing technical solution, in this application, the transmit end may flexibly determine the ranging precision based on the ranging parameter, and gradually reduce the first distance (which may also be understood as a maximum unambiguous distance) based on the ranging precision, to increase the bandwidth of the ranging signal, so that a conflict between a ranging range and the ranging precision is resolved, and the ranging precision is improved while the distance ambiguity is avoided.

With reference to the first aspect, in some implementations of the first aspect, when the second ranging parameter is the second signal-to-noise ratio, the method further includes: The transmit end determines the second ranging precision based on the second signal-to-noise ratio. When a value of the second ranging precision is greater than a first threshold, the transmit end performs the $(N+1)^{th}$ time of ranging. Alternatively, when a value of the second ranging precision is less than or equal to a first threshold, the transmit end ends the ranging.

In other words, in this application, the transmit end may flexibly determine the ranging precision based on the ranging parameter. When the ranging precision is greater than the first threshold that is of the ranging precision and that is specified by the system, the transmit end performs next-stage ranging. When the ranging precision is less than or equal to the first threshold that is of the ranging precision and that is specified by the system, the ranging procedure is ended.

It should be understood that, in this application, alternatively, when the signal-to-noise ratio is less than or equal to a second threshold that is of the signal-to-noise ratio and that is specified by the system, next-stage ranging may be performed. When the signal-to-noise ratio is greater than a second threshold that is of the signal-to-noise ratio and that is specified by the system, the ranging procedure is ended. In other words, in this application, there may be a specific mapping relationship between the signal-to-noise ratio and the ranging precision. A relationship between a value of the signal-to-noise ratio and a threshold is determined, so that whether the ranging precision meets the ranging precision specified by the system is also obtained, thereby improving flexibility.

With reference to the first aspect, in some implementations of the first aspect, the method further includes: The transmit end determines a second distance of the ranging signal. No distance ambiguity point exists in the second distance within a ranging range supported by the system. The transmit end generates a second ranging waveform based on the type of the ranging signal and the second distance. The transmit end sends the second ranging waveform to the receive end. The first ranging parameter is determined based on the second ranging waveform. The second distance is greater than the first distance.

With reference to the first aspect, in some implementations of the first aspect, a quantity of subcarriers of the ranging signal is M, M is 2 to the power of K, and K≥3. A quantity of zero power subcarriers of the ranging signal is P, and $$\frac{M}{2} \le M - 2 \le M - 2.$$

A quantity of non-zero power subcarriers of the ranging signal is Q, and $$2 \le Q \le \frac{M}{2}.$$

Based on the foregoing technical solution, root-mean-square bandwidth of the ranging signal is increased based on the ranging signal provided in this application, so that the ranging precision can be further improved.

According to a second aspect, this application provides a ranging method. The method includes: A receive end sends a first ranging parameter to a transmit end. The first ranging parameter is sent in an $N^{th}$ time of ranging. The first ranging parameter includes a first ranging precision of a ranging signal and/or a first signal-to-noise ratio of the ranging signal. The receive end receives a first ranging waveform from the transmit end. The first ranging waveform is generated based on the first ranging parameter. The receive end determines the second ranging parameter based on the first ranging waveform. The second ranging parameter includes a second ranging precision of the ranging signal and/or a second signal-to-noise ratio of the ranging signal. The second ranging precision is less than the first ranging precision. When a value of the second ranging parameter does not meet a threshold of a system, the receive end performs an $(N+1)^{th}$ time of ranging. Alternatively, when a value of the second ranging parameter meets a threshold of a system, the receive end ends ranging. N is an integer greater than 0.

Based on the foregoing technical solution, in this application, the receive end may implement high-precision ranging while avoiding distance ambiguity through multi-stage ranging.

With reference to the second aspect, in some implementations of the second aspect, that the first ranging waveform is generated based on the first ranging parameter includes: The first ranging waveform is generated based on a type of the ranging signal and a first distance. The first distance is generated based on the first ranging parameter.

With reference to the second aspect, in some implementations of the second aspect, when the first ranging parameter is the first signal-to-noise ratio, that the first distance is generated based on the first ranging parameter includes: The first distance is generated based on the first ranging precision. The first ranging precision is generated based on the first signal-to-noise ratio.

With reference to the second aspect, in some implementations of the second aspect, when the second ranging parameter is the second signal-to-noise ratio, the method further includes: The receive end determines the second ranging precision based on the second signal-to-noise ratio. When a value of the second ranging precision is greater than a first threshold, the receive end performs the $(N+1)^{th}$ time of ranging. Alternatively, when a value of the second ranging precision is less than or equal to a first threshold, the receive end ends the ranging.

With reference to the second aspect, in some implementations of the second aspect, the receive end receives a second ranging waveform from the transmit end. The second ranging waveform is generated based on the type of the ranging signal and a second distance. No distance ambiguity point exists in the second distance within a ranging range supported by the system. The second distance is greater than the first distance. The receive end determines the first ranging parameter based on the second ranging waveform. When a value of the first ranging parameter does not meet the threshold of the system, the receive end performs the $(N+1)^{th}$ time of ranging. Alternatively, when a value of the first ranging parameter meets the threshold of the system, the receive end ends the ranging.

With reference to the second aspect, in some implementations of the second aspect, a quantity of subcarriers of the ranging signal is M, M is 2 to the power of K, and K≥3. A quantity of zero power subcarriers of the ranging signal is P, and $$\frac{M}{2} \le P \le M - 2.$$

A quantity of non-zero power subcarriers of the ranging signal is Q, and $$2 \leq Q \leq \frac{M}{2}.$$

According to a third aspect, a ranging apparatus is provided. The apparatus is configured to perform the ranging method in any one of the first aspect or the possible implementations of the first aspect.

According to a fourth aspect, a ranging apparatus is provided. The apparatus is configured to perform the ranging method in any one of the second aspect or the possible implementations of the second aspect.

According to a fifth aspect, a ranging apparatus is provided. The ranging apparatus includes a processor. The processor is coupled to a memory, and may be configured to execute instructions in the memory, to implement the method in any one of the possible implementations of the first aspect. Optionally, the ranging apparatus further includes the memory. Optionally, the ranging apparatus further includes a communication interface, and the processor is coupled to the communication interface.

In an implementation, the ranging apparatus is a terminal device. When the ranging apparatus is the terminal device, the communication interface may be a transceiver or an input/output interface.

In another implementation, the ranging apparatus is a chip configured in a terminal device. When the ranging apparatus is the chip configured in the terminal device, the communication interface may be an input/output interface.

In an implementation, the ranging apparatus is a donor node device. When the ranging apparatus is the donor node device, the communication interface may be a transceiver or an input/output interface.

In another implementation, the ranging apparatus is a chip configured in a donor node. When the ranging apparatus is the chip configured in the donor node, the communication interface may be an input/output interface. Optionally, the transceiver may be a transceiver circuit. Optionally, the input/output interface may be an input/output circuit.

According to a sixth aspect, a ranging apparatus is provided. The ranging apparatus includes a processor. The processor is coupled to a memory, and may be configured to execute instructions in the memory, to implement the method in any one of the possible implementations of the second aspect. Optionally, the ranging apparatus further includes the memory. Optionally, the ranging apparatus further includes a communication interface, and the processor is coupled to the communication interface.

In an implementation, the ranging apparatus is a terminal device. When the ranging apparatus is the terminal device, the communication interface may be a transceiver or an input/output interface.

In another implementation, the ranging apparatus is a chip configured in a terminal device. When the ranging apparatus is the chip configured in the terminal device, the communication interface may be an input/output interface.

In an implementation, the ranging apparatus is a donor node device. When the ranging apparatus is the donor node device, the communication interface may be a transceiver or an input/output interface.

In another implementation, the ranging apparatus is a chip configured in a donor node device. When the ranging apparatus is a chip configured in a donor node device, the communication interface may be an input/output interface.

Optionally, the transceiver may be a transceiver circuit. Optionally, the input/output interface may be an input/output circuit.

According to a seventh aspect, a processor is provided. The processor includes an input circuit, an output circuit, and a processing circuit. The processing circuit is configured to: receive a signal by using the input circuit, and transmit a signal by using the output circuit, to enable the processor to perform the method in any one of the possible implementations of the first aspect and the second aspect.

In a specific implementation process, the foregoing processor may be one or more chips, the input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a transceiver, and a signal output by the output circuit may be, for example, but not limited to, output to a transmitter and transmitted by the transmitter. The input circuit and the output circuit may be a same circuit. The circuit is respectively used as the input circuit and the output circuit at different times. Specific implementations of the processor and various circuits are not limited in this embodiment of this application.

According to an eighth aspect, a processing apparatus is provided. The processing apparatus includes a processor and a memory. The processor is configured to: read instructions stored in the memory, receive a signal by using a transceiver, and transmit a signal by using a transmitter, to perform the method in any one of the possible implementations of the first aspect and the second aspect.

Optionally, there are one or more processors, and there are one or more memories.

Optionally, the memory may be integrated with the processor, or the memory and the processor are disposed separately.

In a specific implementation process, the memory may be a non-transitory memory, for example, a read-only memory (ROM), and the memory and the processor may be integrated on a same chip, or may be separately disposed on different chips. A type of the memory and a manner of setting the memory and the processor are not limited in this embodiment of this application.

It should be understood that a related data exchange process, for example, sending indication information, may be a process of outputting the indication information from the processor, and receiving capability information, may be a process of receiving input capability information by the processor. Specifically, data output by the processor may be output to the transmitter, and input data received by the processor may come from the transceiver. The transmitter and the transceiver may be collectively referred to as a transceiver.

The foregoing processing apparatus in the eighth aspect may be one or more chips. The processor in the processing apparatus may be implemented by using hardware, or may be implemented by using software. When implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor, and exists independently.

According to a ninth aspect, a computer program product is provided. The computer program product includes a computer program (which may also be referred to as code or instructions). When the computer program is run, a computer is enabled to perform the method in any one of the possible implementations of the first aspect and the second aspect.

According to a tenth aspect, a computer-readable medium is provided. The computer-readable medium stores a computer program (which may also be referred to as code or instructions). When the computer program is run on a computer, the computer is enabled to perform the method in any one of the possible implementations of the first aspect and the second aspect.

According to an eleventh aspect, a chip system is provided. The chip system includes a processor. The processor is configured to invoke a computer program from a memory and run a computer program, to enable a device installed with the chip system to perform the method in the implementations of the first aspect and the second aspect.

According to a twelfth aspect, a ranging system is provided. The ranging system includes any one of the apparatuses in the third aspect and in the fourth aspect.

BRIEF DESCRIPTION OF DRAWINGS

FIG. 3 is a schematic block diagram of a ranging method according to this application;

DESCRIPTION OF EMBODIMENTS

Figure 1:
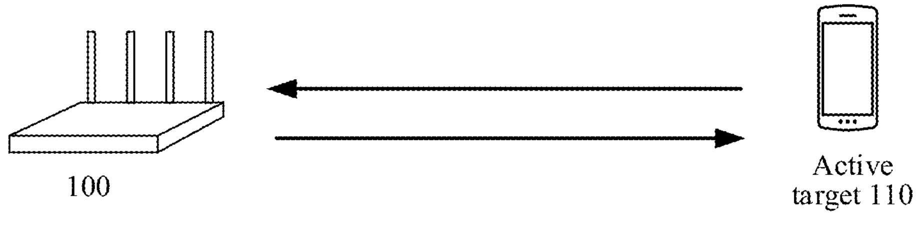
FIG. 1 is a schematic diagram of a scenario to which an embodiment of this application is applicable.

A wireless communication system to which embodiments of this application may be applied includes but is not limited to a global system for mobile communications (GSM) system, a long term evolution (LTE) frequency division duplex (FDD) system, an LTE time division duplex (TDD) system, an LTE system, a long term evolution-advanced (LTE-Advanced, LTE-A) system, a next generation communication system (for example, a 5G communication system or a 6G communication system), a converged system of a plurality of access systems, or an evolved system.

The technical solutions provided in this application may be further applied to machine type communication (MTC), a long term evolution-machine (LTE-M) technology, a device-to-device (D2D) network, a machine-to-machine (M2M) network, an internet of things (IoT) network, or another network. The IoT network may include, for example, internet of vehicles. Communication methods in an internet of vehicles system are collectively referred to as vehicle-to-X (V2X, where X can represent everything). For example, the V2X may include vehicle-to-vehicle (V2V) communication, vehicle-to-infrastructure (V2I) communication, vehicle-to-pedestrian (V2P) communication, or vehicle-to-network (V2N) communication.

A terminal device in embodiments of this application is an entry for interaction between a mobile user and a network, and can provide a basic computing capability and a basic storage capability, display a service window to the user, and accept an operation input of the user. A terminal device in 5G may establish a signal connection and a data connection to a radio access network device by using a new radio technology, to transmit a control signal and service data to a mobile network. The terminal device in embodiments of this application may include various access terminals, mobile devices, user terminals, or user apparatuses that have a wireless communication function. For example, the terminal device may be user equipment (UE), for example, a mobile phone, a tablet computer (pad), a desktop computer, a computer having a wireless transceiver function, or a virtual reality (VR) terminal device, a television, or an augmented reality (AR) terminal device. The terminal device may alternatively be a wireless terminal in industrial control, a machine type communication (MTC) terminal, customer premise equipment (CPE), a wireless terminal in self-driving, a wireless terminal in telemedicine, a wireless terminal in a smart grid, a wireless terminal in transportation safety, a wireless terminal in a smart city, a smart home, a smart speaker, an electronic door lock, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an automated guided vehicle (AGV), an uncrewed aerial vehicle, a car, a vehicle-mounted device, a wearable device, a terminal device in a 5G network, a terminal device in a future evolved public land mobile network (PLMN) or a non-public network (NPN), or the like.

The radio access network device in embodiments of this application is similar to a base station in a conventional network. The radio access network device is deployed near the terminal device, provides a network access function for an authorized user in a specific region, and can determine transmission tunnels of different quality based on a user level, a service requirement, and the like to transmit user data. The radio access network device can manage and appropriately utilize a resource of the radio access network device, provide an access service for the terminal device based on a requirement, and is responsible for forwarding the control signal and the user data between the terminal device and a core network. The radio access network device in embodiments of this application may be an access device used by the terminal device to access a mobile communication system in a wireless manner. The radio access network device may be a base station, an evolved NodeB (eNB), a home base station, an access point (AP) in a wireless fidelity (Wi-Fi) system, a station (STA), a wireless relay node, a wireless backhaul node, a transmission point (TP) or a transmission reception point (TRP), a macro base station or a micro base station, a high frequency base station, or the like. Alternatively, the radio access network device may be a next generation NodeB (gNB) in an NR system, or may be a component or a part of a device forming the base station, such as a central unit (CU), a distributed unit (DU), or a baseband unit (BBU). It should be understood that a specific technology and a specific device form used by the radio access network device are not limited in embodiments of this application. In this application, the radio access network device is referred to as a network device for short.

Unless otherwise specified, in this application, all network devices refer to radio access network devices. In this application, the network device may be a network device, or may be a chip used in the network device to complete a wireless communication processing function.

Figure 2:
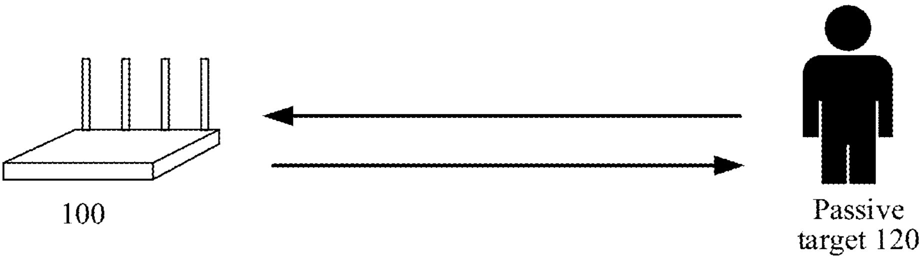
FIG. 2 is a schematic diagram of a scenario to which an embodiment of this application is applicable.

The following describes in detail scenarios to which embodiments of this application are applicable with reference to FIG. 1 and FIG. 2.

In this application, a ranging method may be applied to various devices that support a ranging function, including the various terminal devices and the various radio access network devices mentioned above. As shown in FIG. 1, this application may be applied to an active target ranging scenario, for example, may be applied to a scenario in which one or more transmit ends 100 (for example, a transmitter device) perform ranging or positioning on one or more active devices 110 (for example, a receiver). The transmit end 100 may be the foregoing radio access network device or the foregoing terminal device. The active device 110 may also be the foregoing radio access network device or the foregoing terminal device. As shown in FIG. 2, this application may be applied to a passive device ranging scenario. For example, this application may be applied to a scenario in which one or more devices 100 (for example, a transmitter device and a receiver) perform ranging or positioning on one or more passive devices 120. The device 100 may have both the transmitter device and the receiver, or may have only the transmitter device or the receiver. The passive device 120 may be, for example, a person. In the active ranging scenario, the transmitter device and the receiver belong to different devices. In passive target ranging, the transmitter device and the receiver may belong to a same device or different devices. In this application, the active device may be a device that has a function of sending and receiving a signal, for example, a base station, a mobile phone, a router, or a radio frequency identification (RFID) device. The passive device in this application may be a device that does not have the function of sending and receiving a signal, for example, a person, an animal, a car, an airplane, or a building.

For ease of understanding, the following briefly describes terms in this application.

Root-mean-square bandwidth: Root-mean-square bandwidth for a time domain signal S(t) is defined as:

$$B_{RMS} = \sqrt{\frac{\int_{-\infty}^{\infty} |S(f)|^2 f^2 df}{\int_{-\infty}^{\infty} |S(f)|^2 df}}.$$

f is a frequency, S(f) is Fourier transform (namely, a spectrum) of the signal, and $|S(f)|^2$ is a power spectral density of the signal. It should be understood that signals with the same power or a same maximum frequency may not have an equal root-mean-square bandwidth.

Angular frequency: A unit of the angular frequency is rad/s (radian per second). A relationship between the angular frequency and the frequency f is as follows:

$$\omega=2\pi f.$$

Cramer-Rao lower bound (CRLB): The Cramer-Rao lower bound is a lower bound of a variance of an unbiased estimator and describes best performance that the unbiased estimator can achieve. Based on the CRLB, a lower bound of precision δ of performing ranging by using the signal S(t) under a condition of Gaussian white noise is inversely proportional to the root-mean-square bandwidth of the S(t) and is also inversely proportional to a square root of a signal-to-noise ratio (SNR), that is, $$\delta \geq \frac{\alpha \cdot c}{\sqrt{SNR} \cdot B_{RMS}}.$$

α is a constant, and c is a signal propagation speed.

Ranging may be performed based on a phase of a received signal. A ranging signal may be a single-carrier signal, a dual-carrier signal, or a signal including a plurality of subcarriers (for example, orthogonal frequency division multiplexing (OFDM) signal). The single-carrier signal is used as an example. It is assumed that a transmitted signal is:

$$x(t)=e^{j\omega t}.$$

ω is a carrier angular frequency and t is time. Assuming that a signal transmission delay is τ, a received signal is:

$$y(t)=x(t-\tau)=e^{j\omega(t-\tau)}=e^{-j\omega\tau}x(t)=e^{j\phi(\tau)}x(t).$$

$\phi(t)=-\omega t$ is a phase delay of the received signal relative to the transmitted signal.

Assuming that the propagation speed is c, a distance can be estimated as:

$$d=c\tau.$$

Phase-based ranging has a problem of ambiguity. For one observation value, there are a plurality of phase ambiguity points, and a spacing between the phase ambiguity points is 2π. Correspondingly, phase ambiguity results in distance ambiguity, to be specific, one distance observation value corresponds to a plurality of potential true distances.

In dual-carrier phase difference based ranging, a ranging range conflicts with ranging precision. A larger ranging range requires a larger unambiguous distance supported by a system, that is, requires a smaller dual-carrier frequency difference. A smaller frequency difference means smaller bandwidth. Based on the CRLB, the ranging precision decreases when the bandwidth becomes smaller. Although the decision can be improved by increasing signal power, power consumption of the system is also increased.

In the dual-carrier phase difference based ranging method, two carrier signals whose frequency spacing is $\Delta f=f_1-f_2$ are sent. A receive end knows initial phases of the two carrier signals at a transmit end, detects the change amounts $\{\phi_i\}$ (i=1, 2) of phases of the two carrier signals relative to the initial phases, calculates a difference $\Delta\phi=\phi_1-\phi_2$ between the change amounts, and estimates a signal transmission delay τ by using the following formula:

$$\tau = -\frac{\Delta\phi}{2\pi\Delta f}.$$

A distance is estimated as d=cτ, where a propagation speed is c.

In an OFDM multi-carrier phase based ranging method, a transmitted signal is an OFDM signal, a subcarrier frequency $\{f_i\}$ of the OFDM signal is evenly distributed, and a spacing is Δf. The receive end knows an initial phase of each subcarrier of the transmit end, detects a change amount $\{\phi_i\}$ of a phase of each subcarrier relative to the initial phase, performs linear fitting on the phase change amount $\{\phi_i\}$ and the frequency $\{f_i\}$, and estimates a delay by fitting a slope of a straight line, to estimate a distance. A linear relationship between the phase change amount and the frequency is as follows:

$$\phi_i = -2\pi f_i \tau.$$

In this way, a signal transmission delay $\tau$ is estimated, and a distance is estimated as $d=c\tau$, where a propagation speed is c.

Currently, in phase-based ranging, to support unambiguous ranging of a large-distance range, a frequency spacing of a carrier is required to be small, resulting in reduction of ranging precision. For example, in phase-based ranging using dual-carrier and multi-carrier signals, to support the unambiguous ranging of the large-distance range, a frequency spacing of a carrier is required to be small, resulting in the reduction of the ranging precision. In phase-based ranging using a single-carrier signal, to support the unambiguous ranging of the large-distance range, a frequency of a carrier is required to be small, resulting in the reduction of the ranging precision. It can be learned that currently a ranging range conflicts with the ranging precision.

This application provides a ranging method. Based on a relationship between a maximum unambiguous distance and a wavelength of a single-carrier signal, a frequency difference of a dual-carrier signal, and a frequency spacing of frequency components of a multi-carrier signal, a maximum unambiguous distance of a ranging signal can be gradually reduced, to implement high-precision ranging while avoiding distance ambiguity.

FIG. 3 is a schematic diagram of a ranging method 300 according to an embodiment of this application. The method in FIG. 3 includes the following steps.

Step S310: A transmit end receives a first ranging parameter from a receive end. The first ranging parameter is received in an $N^{th}$ (where N is an integer greater than 0) time of ranging. The first ranging parameter includes a first ranging precision of a ranging signal and/or a first signal-to-noise ratio of the ranging signal.

It should be noted that, in this application, the transmit end may be a network device (for example, a base station) or may be a terminal device (for example, user equipment).

It should be noted that, in this application, a ranging parameter may be used to determine ranging precision. In other words, the ranging parameter mentioned in this application includes but is not limited to the ranging precision and a signal-to-noise ratio, and may also include another ranging parameter. Any ranging precision that can be determined (or may be understood as obtained) by using these parameters falls within the protection scope of this application.

In a possible implementation, the first ranging parameter may be the first ranging precision, or the first ranging parameter may be the first signal-to-noise ratio. The first ranging parameter may alternatively include both the first ranging precision and the first signal-to-noise ratio.

Step S320: The transmit end determines a first ranging waveform based on the first ranging parameter.

It should be noted that, in this application, the ranging signal may be of a single-carrier type, a dual-carrier type, or a multi-carrier type. A type of the ranging signal is not limited in this application.

In this application, a first distance may be determined based on the first ranging parameter. For example, the first distance may be determined based on the first ranging precision. In this application, the first distance may be an integer multiple of the first ranging precision. If the first ranging parameter includes both the first ranging precision and the first signal-to-noise ratio, the transmit end may determine a parameter to be used to determine the first distance. Alternatively, a system may preset a priority, for example, preferentially use the first ranging precision to determine the first distance. In other words, when the ranging parameter received by the transmit end includes two or more types of parameters, the transmit end may flexibly select a parameter to be used to determine the first distance. This is not limited in this application.

In this application, bandwidth of the ranging signal may be obtained based on the type of the ranging signal and the first distance, to generate a ranging waveform, and perform ranging on the transmit end and the receive end. In this application, the "bandwidth of the ranging signal" may be a frequency of a single-carrier signal, a carrier spacing (bandwidth) of a dual-carrier signal, or a non-zero subcarrier frequency spacing of a multi-carrier signal.

In an example, for a dual-carrier ranging signal, a bandwidth of the dual-carrier ranging signal may be calculated based on a dual-carrier bandwidth calculation formula (for example, $$D_m = \frac{c}{|f_1 - f_2|},$$

where for details, refer to descriptions in a method 400). In another example, for a multi-carrier ranging signal, a bandwidth of the multi-carrier ranging signal may be determined based on a multi-carrier bandwidth (where bandwidth may also be understood as a frequency spacing between two adjacent non-zero subcarriers) calculation formula (for example, $$D_m = \frac{c}{K \cdot \Delta f},$$

where for details, refer to descriptions in the method 400).

It should be understood that, if the ranging waveform cannot be generated due to a limitation of a system specification, a ranging procedure is ended. For example, a case in which the ranging waveform cannot be generated includes: A frequency of a single-carrier signal reaches a system capability limit; a frequency difference of a dual-carrier signal reaches a system capability limit; or bandwidth of a multi-carrier signal reaches a system capability limit. In this case, the transmit end may end the ranging.

Step S330: The transmit end sends the first ranging waveform to the receive end.

In a possible implementation, the transmit end may send the first ranging waveform to the receive end.

Step S340: The transmit end receives a second ranging parameter from the receive end. The second ranging parameter is determined based on the first ranging waveform. The second ranging parameter includes a second ranging precision of the ranging signal and/or a second signal-to-noise ratio of the ranging signal. The second ranging precision is less than the first ranging precision.

In a possible implementation, the receive end may determine the second ranging parameter based on the first ranging waveform. For example, the second ranging parameter may be the second ranging precision, or the second ranging parameter may be the second signal-to-noise ratio. It should be understood that the second ranging parameter may alternatively include both the second ranging precision and the second signal-to-noise ratio.

Step S350: The transmit end determines, based on the second ranging parameter and a threshold of the system, whether to perform a next time of ranging.

In a possible implementation, when a value of the second ranging parameter does not meet the threshold of the system, the transmit end performs an $(N+1)^{th}$ time of ranging. Alternatively, when a value of the second ranging parameter meets the threshold of the system, the transmit end may end the ranging.

In an example, when the second ranging precision is greater than a first threshold that is of ranging precision and that is specified by the system, next-stage ranging may be performed. When the second ranging precision is less than or equal to a first threshold that is of ranging precision and that is specified by the system, the ranging procedure is ended.

In another example, when the second signal-to-noise ratio is less than or equal to a second threshold that is of a signal-to-noise ratio and that is specified by the system, next-stage ranging may be performed. When the second signal-to-noise ratio is greater than a second threshold that is of a signal-to-noise ratio and that is specified by the system, the ranging procedure is ended. In other words, in this application, there may be a specific mapping relationship between the signal-to-noise ratio and the ranging precision. A relationship between the second signal-to-noise ratio and a signal-to-noise ratio threshold (for example, the second threshold) is determined, so that whether the ranging precision meets the ranging precision specified by the system is also obtained, thereby improving flexibility.

It should be understood that, if the second ranging parameter includes both the second ranging precision and the second signal-to-noise ratio, the transmit end may preferentially use the second ranging precision to determine whether the ranging precision meets the ranging precision specified by the system. Alternatively, the transmit end may determine, based on both the second ranging precision and the second signal-to-noise ratio, whether the ranging precision meets the ranging precision specified by the system. When a result of determining, by the transmit end based on the second signal-to-noise ratio, whether the ranging precision meets the ranging precision specified by the system is inconsistent with a result of determining by the transmit end directly based on the second ranging precision, the transmit end may preferentially use the determining result based on the second ranging precision. Alternatively, provided that it is determined, based on one of the ranging parameters, that the ranging precision specified by the system is met, the transmit end determines that the ranging procedure can be ended. Alternatively, provided that it is determined, based on one of the ranging parameters, that the ranging precision specified by the system is not met, the transmit end determines that the $(N+1)^{th}$ time of ranging can be performed. In other words, when two ranging parameters are fed back at same time, a person skilled in the art can flexibly set a determining rule, so that the transmit end determines whether the ranging precision specified by the system is met.

Figure 4:
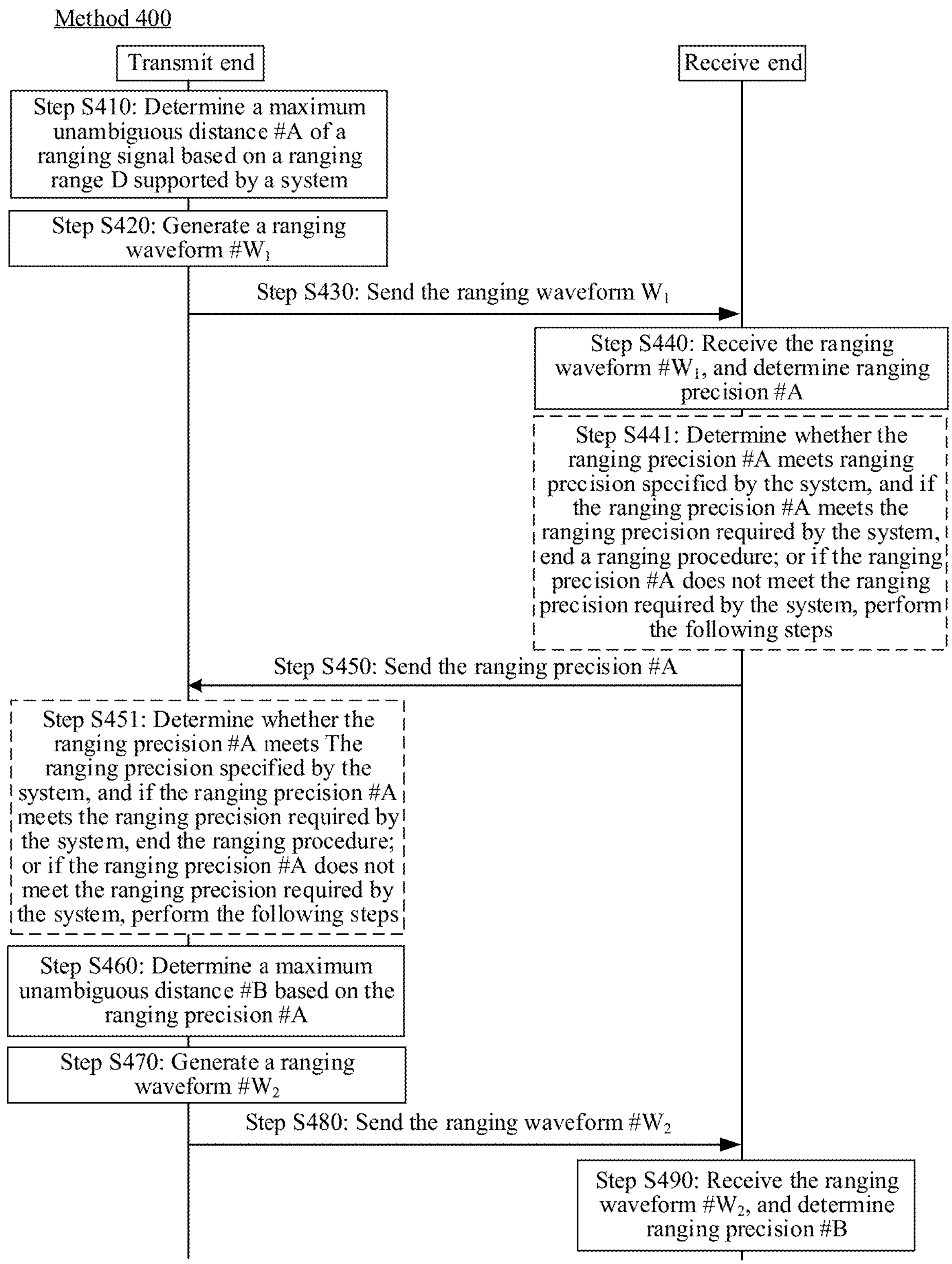
FIG. 4 is a schematic block diagram of a ranging method according to this application.

According to the method provided in this application, ranging is performed in stages, so that a conflict between a ranging range and the ranging precision is resolved, and the ranging precision is improved while the distance ambiguity is avoided. FIG. 4 is a schematic diagram of a ranging method 400 according to an embodiment of this application. The method in FIG. 4 includes the following steps.

Step S410: A transmit end determines a maximum unambiguous distance #A of a ranging signal.

In a possible implementation, it is assumed that a ranging range D is supported by a system, the transmit end (for example, a transmitter device) may determine a maximum unambiguous distance $D_m$ of the ranging signal based on the ranging range D supported by the system, where $D_m \geq D$. For example, $D_1 \geq D$. Optionally, in some embodiments, the transmit end may initialize a number of a ranging stage, for example, set m to 1.

Step S420: The transmit end generates a ranging waveform $\#W_m$.

In a possible implementation, the transmit end may generate the ranging waveform $W_m$ based on a type of the ranging signal and a relationship between the determined maximum unambiguous distance $D_m$ and a waveform parameter. For example, the transmit end may generate a ranging waveform $W_1$ based on the type of the ranging signal and a relationship between a determined maximum unambiguous distance $D_1$ and the waveform parameter.

It should be understood that, in this application, the ranging waveform $W_m$ refers to a specific implementation of a signal class, for example, a single-carrier type, a dual-carrier type, or a multi-carrier type, and is a waveform $W_{m(t)}$ corresponding to a continuous time segment. Key parameters of the ranging waveform are the signal class, duration, and a wavelength (for the single-carrier type) or a frequency spacing (for the dual-carrier type and the multi-carrier type).

In an example, if the ranging signal is a single-carrier ranging signal, $$D_m = \frac{c}{f},$$

where c is a speed of light, and f is a frequency of the single-carrier signal.

In an example, if the ranging signal is a dual-carrier ranging signal, $$D_m = \frac{c}{|f_1 - f_2|},$$

where c is a speed of light, and $f_1$ and $f_2$ are frequencies of the two carrier signals.

In an example, if the ranging signal is a multi-carrier signal (for example, an OFDM signal), $$D_m = \frac{c}{K \cdot \Delta f},$$

where c is a speed of light, K is a minimum spacing quantity between non-zero power subcarriers, and $\Delta f$ is a subcarrier spacing frequency.

The foregoing wavelength (for the single-carrier type) or frequency spacing (for the dual-carrier type and the multi-carrier type) may be calculated based on $D_m$. After the wavelength and the frequency spacing are determined, the duration of the waveform is determined to determine the ranging waveform $W_m$.

Step S430: The transmit end sends the ranging waveform $\#W_m$ to a receive end.

In a possible implementation, the transmit end may send the ranging waveform $W_1$ to the receive end (for example, a receiver).

In some embodiments, if the ranging waveform cannot be generated due to a limitation of a system specification, a ranging procedure is ended. For example, a case in which the ranging waveform cannot be generated in this application may include but is not limited to: The frequency of the single-carrier signal reaches a system capability limit; a frequency difference of the dual-carrier signal reaches a system capability limit; or bandwidth of the multi-carrier signal reaches a system capability limit.

Step S440: The receive end receives the ranging waveform $\#W_m$, and estimates ranging precision #A.

Method 1:

In a possible implementation, the receive end may calculate ranging precision $\delta_m$ based on a formula and based on the type of the ranging signal and a signal-to-noise ratio.

In this application, the signal-to-noise ratio may be estimated by the receiver based on the strength and a noise level of the received ranging signal. Alternatively, the signal-to-noise ratio may be estimated by the receiver based on a signal other than the ranging signal. For example, a signal-to-noise ratio of a preamble of a header of a frame may be estimated. In an example, if the ranging signal is the single-carrier ranging signal, $$\delta_m = \frac{\alpha \cdot c}{\sqrt{SNR} \cdot f},$$

where $\alpha$ is a constant greater than 0, and may be pre-calibrated based on measured performance, c is a propagation speed of the signal, and f is the frequency of the single-carrier signal.

In an example, if the ranging signal is the dual-carrier ranging signal, $$\delta = \frac{\alpha \cdot c}{\sqrt{SNR} \cdot |f_1 - f_2|},$$

where $\alpha$ is a constant greater than 0, and may be pre-calibrated based on measured performance, c is a propagation speed of the signal, and $f_1$ and $f_2$ are the frequencies of the two carrier signals.

In an example, if the ranging signal is the multi-carrier signal (for example, the OFDM signal), $$\delta = \frac{\alpha \cdot c}{\sqrt{SNR} \cdot B_{RMS}},$$

where $\alpha$ is a constant greater than 0, and may be pre-calibrated based on measured performance, c is a propagation speed of the signal, and $B_{RMS}$ is root-mean-square bandwidth of the signal.

Method 2:

In a possible implementation, the receive end may look up a pre-calibrated table based on the type of the ranging signal, a parameter, and an SNR, to obtain estimated ranging precision $\delta_m$.

It should be noted that, in this application, if a value of a signal-to-noise ratio fed back by the transmit end does not exist in the table, the receive end may determine a value of the SNR by using a nearest neighbor value or an interpolation method, to determine the ranging precision.

In this embodiment, the table is stored in the receive end, and subsequently the receive end may feed back the queried ranging precision to the transmit end. It may also be understood that, in this embodiment, Table 1 is configured at the receive end.

In an example, it is assumed that the receive end receives the ranging waveform $\#W_m$, and determines, based on the ranging waveform $\#W_m$, that the signal is of the multi-carrier type, and that root-mean-square bandwidth for the multi-carrier type is 1 MHz. The receive end estimates that the signal-to-noise ratio is 30 dB based on a strength and a noise level of the received ranging signal. The system specifies a calibration parameter $\alpha$=2, and the receive end may determine that the ranging precision is 19 m.

TABLE 1

Ranging precision lookup table

| Signal class | Signal parameter | Calibration parameter | SNR (dB) | Ranging precision (m) |
|---|---|---|---|---|
| Single-carrier | Frequency f = 700 MHz | $\alpha = 2$ | 10 | 0.271 |
| | | | 20 | 0.086 |
| | | | 30 | 0.027 |
| | Frequency f = 2 GHz | $\alpha = 1.8$ | 10 | 0.085 |
| | | | 20 | 0.027 |
| | | | 30 | 0.009 |
| Dual-carrier | Frequency difference $\Delta f$ = 1 MHz | $\alpha = 2$ | 10 | 190 |
| | | | 20 | 60 |
| | | | 30 | 19 |
| | Frequency difference $\Delta f$ = 10 MHz | $\alpha = 1.8$ | 10 | 17 |
| | | | 20 | 5.4 |
| | | | 30 | 1.7 |
| | Frequency difference $\Delta f$ = 100 MHz | $\alpha = 1.5$ | 10 | 1.42 |
| | | | 20 | 0.45 |
| | | | 30 | 0.142 |
| Multi-carrier | Root-mean-square bandwidth $B_{RMS}$ = 1 MHz | $\alpha = 2$ | 10 | 190 |
| | | | 20 | 60 |
| | | | 30 | 19 |
| | Root-mean-square bandwidth $B_{RMS}$ = 10 MHz | $\alpha = 1.8$ | 10 | 17 |
| | | | 20 | 5.4 |
| | | | 30 | 1.7 |
| | Root-mean-square bandwidth $B_{RMS}$ = 100 MHz | $\alpha = 1.5$ | 10 | 1.42 |
| | | | 20 | 0.45 |
| | | | 30 | 0.142 |

Method 3:

In a possible implementation, a protocol between the receive end and the transmit end may stipulate that the ranging waveform $\#W_m$ is used to perform a plurality of times of ranging, and the ranging precision $\delta_m$ is estimated based on a ranging result $\{R_i\}$ (i=1, 2, 3, . . . , or N). For example, a standard deviation of a sample of the ranging result $\{R_i\}$ is used as the estimated ranging precision $\delta_m$.

Step S441: The receive end determines whether the current ranging precision #A meets a requirement of system ranging precision $\delta$.

In a possible implementation, the receive end determines whether the current ranging precision $\delta_m$ meets the requirement of the system ranging precision $\delta$. When $\delta \geq \delta_m$, the ranging procedure may be ended. When $\delta < \delta_m$, the following steps continue to be performed.

It should be noted that, in this application, the transmit end may alternatively determine whether the current ranging precision #A meets the requirement of the system ranging precision $\delta$. In this case, the receive end may directly send the ranging precision #A to the transmit end, and the transmit end determines whether to end the ranging procedure or perform a next time of ranging. It should be understood that, in this case, the receive end may skip performing step S441, in other words, step S441 is an optional step.

Step S450: The receive end sends the ranging precision #A to the transmit end.

In some embodiments, the method further includes: Step S451: The transmit end determines whether the current ranging precision #A meets the requirement of the system ranging precision δ.

As described above, the receive end may directly send the ranging precision #A to the transmit end. In this way, the transmit end may determine whether the current ranging precision #A meets the requirement of the system ranging precision δ. In this way, step S451 is an optional step.

Step S460: The transmit end determines, based on the ranging precision #A, a maximum unambiguous distance #B of the ranging signal for ranging.

In a possible implementation, the transmit end may determine, based on the fed back ranging precision, the maximum unambiguous distance #B of the ranging signal for ranging, that is, $D_{m+1} \geq \gamma\delta_m$, where γ is a constant greater than 0, and a typical value may be 3.

In other words, in this application, the maximum unambiguous distance of the ranging signal may be re-determined based on precision obtained through each time of ranging. Specifically, the re-determined maximum unambiguous distance may be an integer multiple of the ranging precision. It may also be understood that bandwidth of the ranging signal is increased by gradually decreasing the maximum unambiguous distance of the ranging signal (where for example, for the single-carrier type, the wavelength of the single-carrier signal is reduced, and for the dual-carrier type and the multi-carrier type, the bandwidth of the dual-carrier or multi-carrier signal is increased), to improve the ranging precision.

Step S470: The transmit end generates a ranging waveform $\#W_{m+1}$.

In a possible implementation, the transmit end may generate a ranging waveform $W_{m+1}$ based on the type of the ranging signal and a relationship between a determined maximum unambiguous distance $D_{m+1}$ and the waveform parameter.

For details, refer to step S420. Details are not described again.

Step S480: The transmit end sends the ranging waveform $\#W_{m+1}$ to the receive end.

For details, refer to step S430. Details are not described again.

Step S490: The receive end receives the ranging waveform $\#W_{m+1}$, and determines ranging precision #B.

It should be understood that, in this step, the receive end receives the ranging waveform $\#W_{m+1}$. For details, refer to the manner in step S440 to determine the ranging precision #B. Details are not described again.

It should be understood that, in this application, step S420 to step S490 may be repeatedly performed for a plurality of times, until the transmit end (or the receive end) determines that ranging precision in a current stage meets the system ranging precision δ. In this way, the ranging procedure may be ended.

It should be understood that when step S420 to step S490 are repeatedly performed, each time the ranging procedure is repeatedly performed, the number m is increased by 1, that is, m=m+1.

Figure 5:
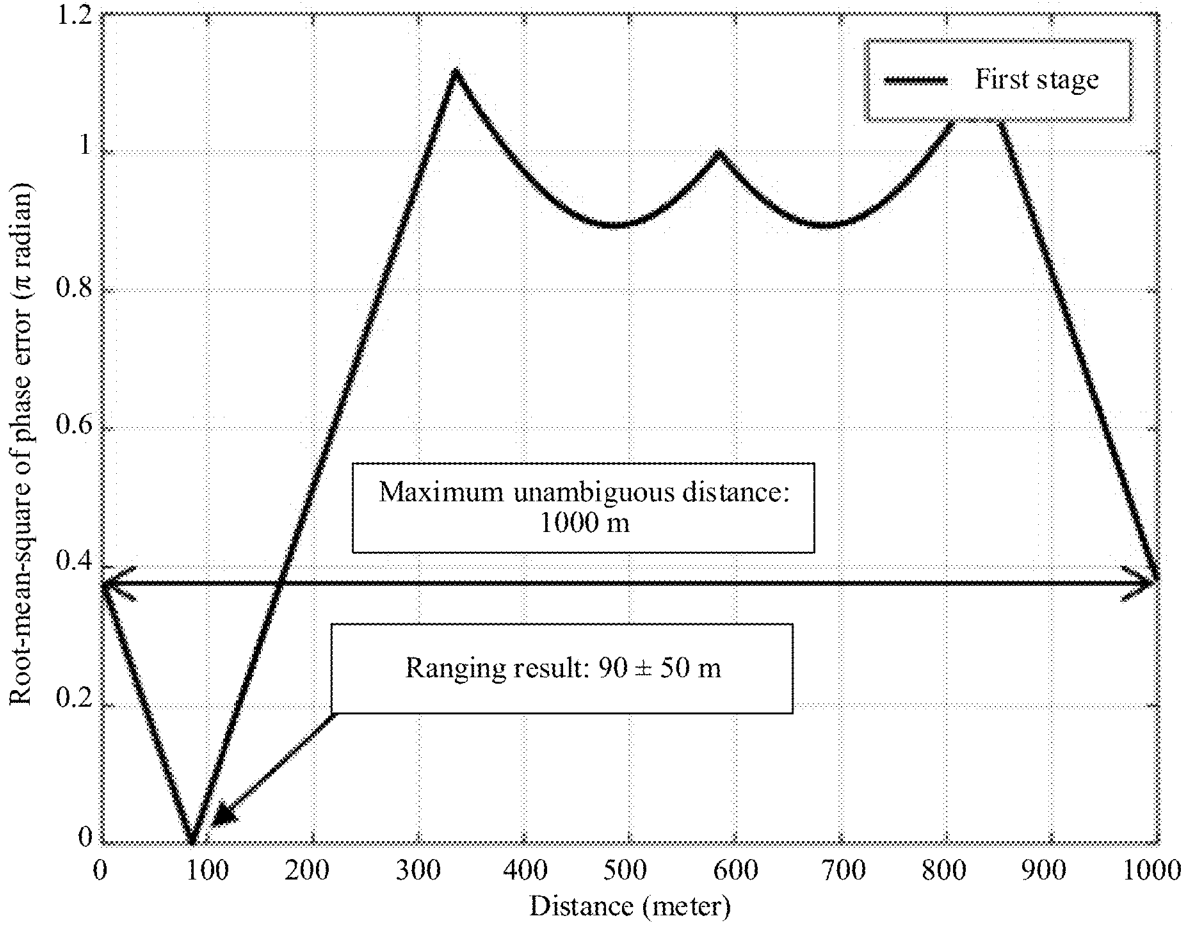
FIG. 5 is a schematic diagram of a ranging method according to this application.

In an example, it is assumed that the transmit end is a base station, and the receive end is user equipment (UE). In an example in which the ranging signal is an OFDM multi-carrier signal, it is assumed that the subcarrier spacing Δf is 15 kHz, a maximum ranging range D supported by the system is 1000 m, the ranging precision δ required by the system is 10 m, and an actual distance R between the base station and the UE is 85 m. As described in the foregoing step S410 to step S490:

First stage: The base station may determine, based on the ranging range D supported by the system being 1000 m, that the maximum unambiguous distance $D_1$ of the ranging signal is greater than or equal to D, and obtain, based on a multi-carrier formula $$D_1 = \frac{c}{K \cdot \Delta f} = 1000 \text{ m},$$

that the minimum spacing quantity K between non-zero power subcarriers is 20. In this case, the base station may determine to send the ranging signal on subcarriers with indexes {0, 20}. The UE may perform ranging based on the foregoing multi-carrier ranging method, to obtain that a distance $R_1$ is 90 m. In this case, the root-mean-square bandwidth $B_{RMS}$ of the multi-carrier signal is K·Δf=300 KHz. Assuming that α is 2, the UE determines that the signal-to-noise ratio of the ranging signal is 32 dB. In this case, that ranging precision $\delta_1$ is 50 m is obtained based on the formula $$\delta = \frac{\alpha \cdot c}{\sqrt{SNR} \cdot B_{RMS}}$$

for calculating multi-carrier precision in the foregoing Method 1. The UE determines that the ranging precision δ that is required by the system, 10 m, is less than the ranging precision that is estimated by the UE, 50 m, and determines that next-stage ranging needs to be performed. Ranging results in the first stage are shown in FIG. 5. To be specific, the UE obtains a distance between the transmit end and the receive end that perform ranging is 90 m, and determines that the ranging precision is 50 m.

Figure 6:
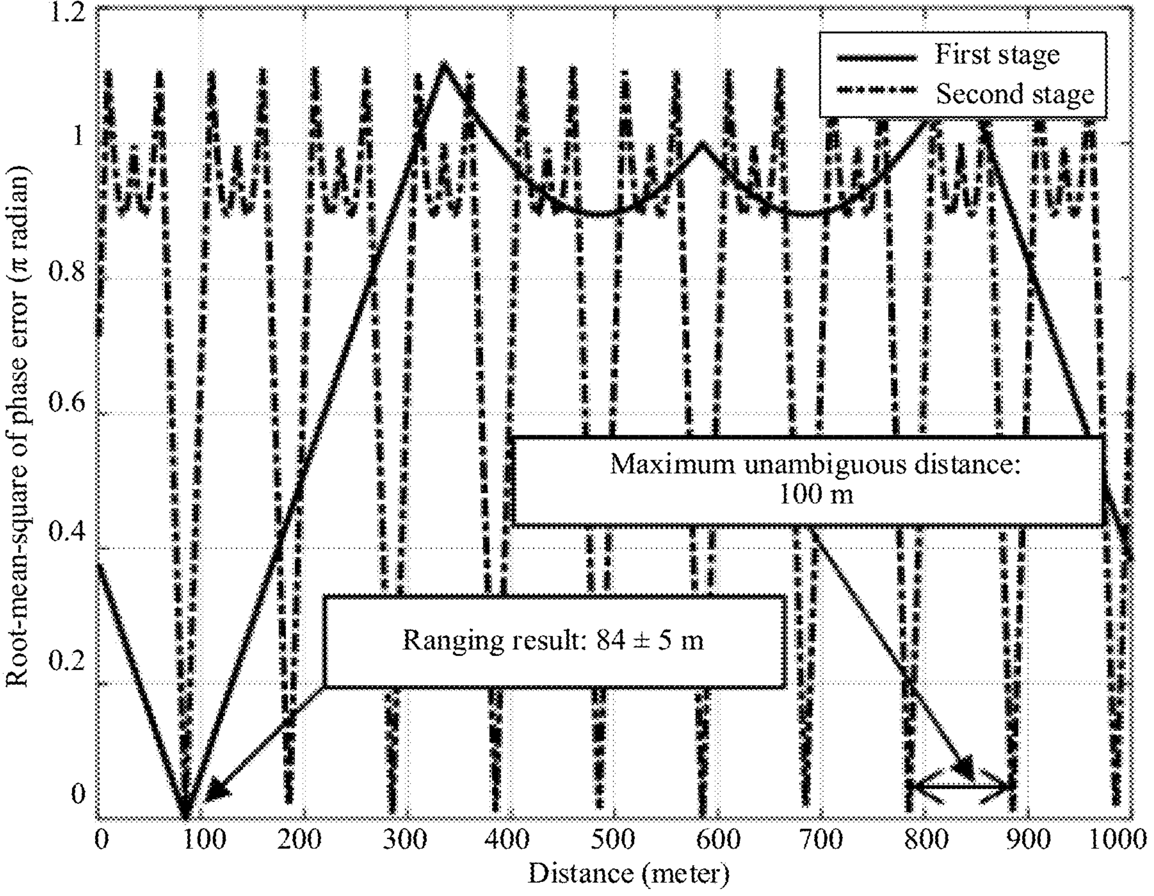
FIG. 6 is a schematic diagram of a ranging method according to this application.

Second stage: The UE sends the ranging precision $\delta_1$ in the first stage, 50 m, to the base station. The base station determines a maximum unambiguous distance $D_2$ of the ranging signal in this stage. As described above, $D_2 \geq \gamma\delta_1$, and in this embodiment, it is assumed that a value of γ is 2. In this case, the base station determines that $D_2 \geq \gamma\delta_1 = 2 \times 50$ m=100 m. Based on a multi-carrier formula $$D_2 = \frac{c}{K \cdot \Delta f} = 100 \text{ m},$$

that the minimum spacing quantity K between non-zero power subcarriers is 200 is obtained. In this case, the base station may determine to send the ranging signal on subcarriers with indexes [0, 200]. The UE performs ranging, and obtains a distance $R_2$ is 84 m. In this stage, the root-mean-square bandwidth $B_{RMS}$ of the multi-carrier signal is K·Δf=3 MHz. Assuming that α is 2, the UE determines that the signal-to-noise ratio SNR of the ranging signal is 32 dB. In this case, ranging precision $\delta_2$, 5 m, is obtained based on the formula $$\delta = \frac{\alpha \cdot c}{\sqrt{SNR} \cdot B_{RMS}}$$

for calculating the multi-carrier precision in the foregoing Method 1. The UE determines that the ranging precision δ required by the system, 10 m, is greater than the ranging precision estimated by the UE, 5 m, and determines to end the ranging procedure. Ranging results of the second stage are shown in FIG. 6. To be specific, the UE obtains a distance between the transmit end and the receive end that perform ranging of 84 m, and determines that the ranging precision is 5 m.

According to the method provided in this embodiment, based on a relationship between the maximum unambiguous distance of the ranging signal and a wavelength and a frequency component spacing of the ranging signal, the receive end may directly feed back the ranging precision, and the maximum unambiguous distance of the ranging signal is gradually reduced through multi-stage ranging, to implement high-precision ranging while avoiding distance ambiguity.

Figure 7:
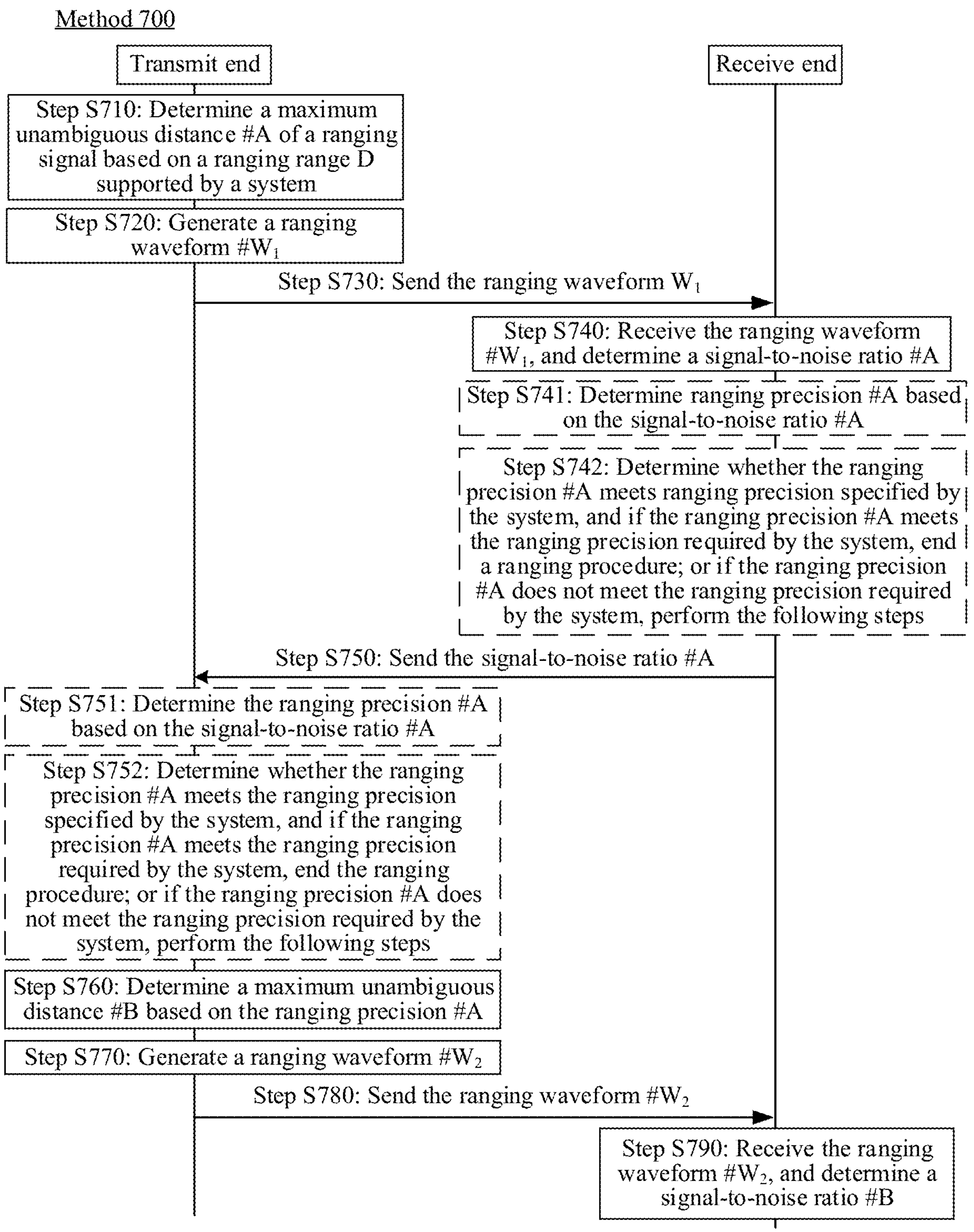
FIG. 7 is a schematic block diagram of a ranging method according to this application.

FIG. 7 is a schematic diagram of a ranging method 700 according to an embodiment of this application. The method in FIG. 7 includes the following steps.

For step S710 to step S730, refer to step S410 to step S430 in the step method 400. Details are not described herein again.

Step S740: The receive end receives a ranging waveform $\#W_1$, and determines a signal-to-noise ratio #A of the ranging waveform.

In a possible implementation, the receive end may estimate the signal-to-noise ratio based on a strength and a noise level of the ranging signal. Alternatively, the receiver may estimate the signal-to-noise ratio based on a signal other than the ranging signal. For example, a signal-to-noise ratio of a preamble of a header of a frame may be estimated.

In some embodiments, the method further includes: Step S741: The receive end determines the ranging precision #A based on the signal-to-noise ratio #A of the ranging waveform.

In a possible implementation, the transmit end may calculate the ranging precision based on the foregoing Method 1. For a specific calculation formula, refer to Method 1 in step S440 in the method 400. Details are not described herein again.

In a possible implementation, the transmit end may determine the ranging precision based on the foregoing Method 2. To be specific, the transmit end may also look up a pre-calibrated table based on a type of the ranging signal, a parameter, and an SNR, to obtain estimated ranging precision $\delta_m$. For details, refer to Method 2 in step S440 in the method 400. Details are not described herein again.

In some embodiments, the method further includes: Step S742: The receive end determines whether the ranging precision #A meets ranging precision specified by the system.

In a possible implementation, the receive end determines whether the current ranging precision $\delta_m$ meets a requirement of a system ranging precision δ. When $\delta \geq \delta_m$, a ranging procedure may be ended. When $\delta < \delta_m$, the following steps continue to be performed.

It should be noted that, in this application, the receive end may alternatively directly send the signal-to-noise ratio #A to the transmit end. The transmit end determines the ranging precision #A based on the signal-to-noise ratio #A, and the transmit end determines whether the ranging precision #A meets the ranging precision specified by the system. In this case, step S741 and step S742 are optional steps.

Step S750: The receive end sends the signal-to-noise ratio SNR to the transmit end.

In some embodiments, the method further includes: Step S751: The transmit end determines the ranging precision #A of the ranging signal based on the received signal-to-noise ratio SNR.

In a possible implementation, the transmit end may calculate the ranging precision based on the foregoing Method 1. To be specific, the transmit end may also calculate the ranging precision $\delta_m$ based on a formula and based on the type of the ranging signal and the SNR. For a specific calculation formula, refer to Method 1 in step S440 in the method 400. Details are not described herein again.

In a possible implementation, the transmit end may determine the ranging precision based on the foregoing Method 2. To be specific, the transmit end may also look up the pre-calibrated table based on the type of the ranging signal, the parameter, and the SNR, to obtain the estimated ranging precision $\delta_m$. For details, refer to Method 2 in step S440 in the method 400. Details are not described herein again. It should be noted that, in this embodiment, Table 1 is stored at the transmit end. It may also be understood that, in this embodiment, Table 1 is preconfigured in the transmit end.

In some embodiments, the method further includes: Step S752: The transmit end determines whether the current ranging precision #A meets the requirement of the system ranging precision δ.

In a possible implementation, the transmit end determines whether the current ranging precision $\delta_m$ meets the requirement of the system ranging precision δ. When $\delta \geq \delta_m$, the ranging procedure may be ended. When $\delta < \delta_m$, the following steps continue to be performed.

In other words, when the receive end directly sends the signal-to-noise ratio to the transmit end, the transmit end may determine the ranging precision based on the signal-to-noise ratio and determine whether the ranging precision meets the requirement of the system. In this case, step S751 and step S752 are further included.

Step S760: The transmit end determines a maximum unambiguous distance #B of the ranging signal.

In a possible implementation, the transmit end may determine the maximum unambiguous distance #B of the ranging signal for ranging based on the ranging precision #A, that is, $D_{m+1} \geq \gamma\delta_m$, where γ is a constant greater than 0, and a typical value of the maximum unambiguous distance #B may be 3.

Step S770: The transmit end generates a ranging waveform $\#W_{m+1}$.

For details, refer to step S720. Details are not described again.

Step S780: The transmit end sends the ranging waveform $\#W_{m+1}$ to the receive end.

For details, refer to step S730. Details are not described again.

Step S790: The receive end receives the ranging waveform $\#W_{m+1}$, and determines a signal-to-noise ratio #B of the ranging waveform.

For details, refer to step S740. Details are not described again.

It should be understood that, in this application, step S720 to step S790 may be repeatedly performed for a plurality of times, until the transmit end (or the receive end) determines that ranging precision in a current stage meets the system ranging precision δ. In this way, the ranging procedure may be ended.

According to the method provided in this embodiment, based on a relationship between the maximum unambiguous distance of the ranging signal and a wavelength and a frequency component spacing of the ranging signal, the receive end enables, by feeding back the signal-to-noise ratio, the transmit end to determine the ranging precision, and the maximum unambiguous distance of the ranging signal is gradually reduced through multi-stage ranging, to implement high-precision ranging while avoiding distance ambiguity.

In OFDM multi-carrier phase-based ranging, signal power is evenly distributed in an entire frequency band, and root-mean-square bandwidth of the signal is less than the occupied bandwidth (about $1/\sqrt{3}$ of the signal bandwidth). Based on a CRLB, this may result in lower ranging precision than that of dual-carrier ranging at same power. A method 800 is a ranging method provided in this application. In this embodiment, a special OFDM waveform may be used as a ranging signal, in other words, signal power is mainly distributed on left and right sides of a signal frequency band. In comparison with a common OFDM waveform in which power is evenly distributed in a frequency band, the ranging signal in this embodiment has a larger root-mean-square bandwidth, and therefore has a higher ranging precision.

Figure 8:
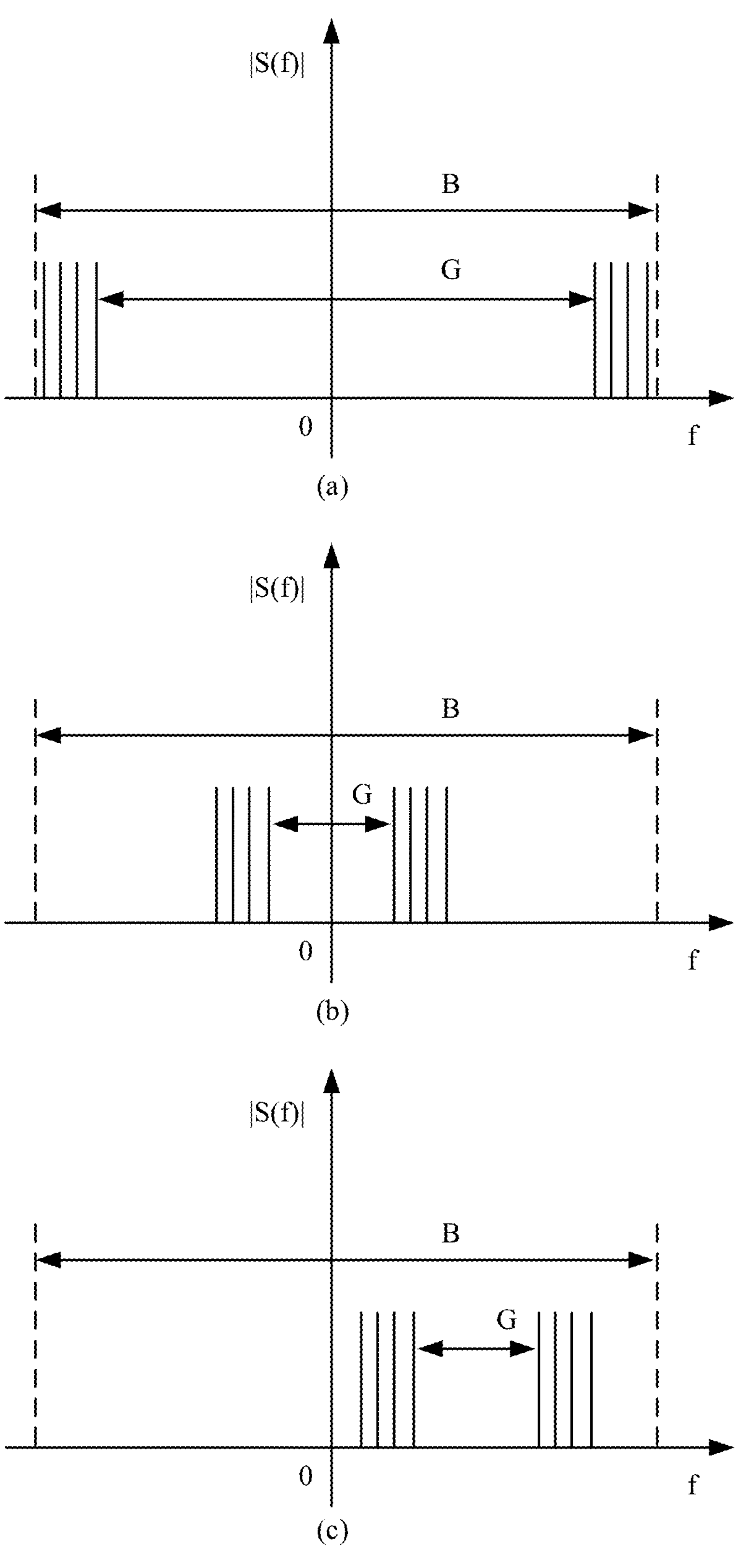
FIG. 8 is a schematic diagram of a ranging signal according to this application.

The OFDM waveform in this embodiment is used as the ranging signal, and a typical waveform may be shown in (a) in FIG. 8, (b) in FIG. 8, or (c) in FIG. 8. f is a frequency, and S(f) is Fourier transform (namely, a spectrum) of the signal.

In an example, in (a) in FIG. 8, it is assumed that the bandwidth of the OFDM waveform is B, but power of the OFDM waveform is distributed only on a minority of subcarriers that are on the leftmost and rightmost of a frequency band in the frequency domain, and the power of a subcarrier within a middle range of the frequency band of bandwidth G is zero.

In an example, in (b) in FIG. 8, power distribution of the OFDM waveform in the frequency domain is more concentrated than that in (a) in FIG. 8. In other words, a frequency spacing G between two groups of non-zero power subcarriers is smaller. It should be noted that, in this case, a larger maximum unambiguous distance may be obtained.

In an example, in (c) in FIG. 8, the power distribution of the OFDM waveform in the frequency domain is asymmetric. That is, the power distribution of the OFDM waveform may be only on [0,f].

It should be understood that the ranging waveform shown in (a) in FIG. 8, (b) in FIG. 8, or (c) in FIG. 8 in this application is merely an example, and is not limited. Any ranging signal having a characteristic that "signal power is mainly distributed on left and right sides of a signal frequency band" falls within the protection scope of this application.

As described above, typical parameters of the OFDM ranging waveform provided in this embodiment of this application are shown in Table 2 below. N is a quantity of subcarriers in fast Fourier transform (FFT), $N_0$ is a quantity of zero power subcarriers in a spacing, and $N_e$ is a quantity of non-zero power subcarriers.

TABLE 2

Typical parameters of an OFDM ranging waveform

| FFT size $N = \frac{B}{\Delta f}$ | Quantity $N_0 = \frac{G}{\Delta f}$ of zero-power subcarriers in a spacing | Quantity $N_e$ of non-zero power subcarriers |
|---|---|---|
| 64 | 0 to 62 | 2, 4, 6, . . . , or 32 |
| 128 | 0 to 126 | 2, 4, 6, . . . , or 64 |
| 256 | 0 to 254 | 2, 4, 6, . . . , or 128 |
| 512 | 0 to 510 | 2, 4, 6, . . . , or 256 |
| 1024 | 0 to 1022 | 2, 4, 6, . . . , or 512 |
| 2048 | 0 to 2046 | 2, 4, 6, . . . , or 1024 |
| 4096 | 0 to 4094 | 2, 4, 6, . . . , or 2048 |

It should be understood that typical examples of the parameters in Table 2 are merely examples, and are not limited.

It should be understood that, in a specific ranging step in this embodiment, ranging may still be performed based on the steps in the method 400 and the method 700, and details are not described again.

According to the method provided in this embodiment of this application, based on a relationship between the maximum unambiguous distance of the ranging signal and a wavelength and a frequency component spacing of the ranging signal, the maximum unambiguous distance of the ranging signal is gradually reduced through multi-stage ranging, to implement high-precision ranging while avoiding distance ambiguity. In addition, the power distribution of the signal is adjusted in the frequency domain, to increase the root-mean-square bandwidth of the ranging signal, and further improve the ranging precision.

The foregoing describes in detail the communication methods provided in embodiments of this application with reference to FIG. 3 to FIG. 8. The following describes communication apparatuses provided in embodiments of this application with reference to FIG. 9 and FIG. 10. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from a perspective of an interaction between nodes. It may be understood that, to implement the foregoing functions, each node, for example, a transmit end device or a receive end device, includes a corresponding hardware structure and/or a corresponding software module for performing the foregoing functions. A person skilled in the art should be aware that the units and the algorithm steps in the examples described with reference to embodiments disclosed in this specification may be implemented in this application by hardware or a combination of hardware and computer software. Whether a function is performed by hardware or hardware driven by computer software depends on particular applications and design constraints of the technical solutions. A person skilled in the art may use different methods to implement the described functions for each specific application. However, it should not be considered that this implementation goes beyond the scope of this application.

In embodiments of this application, function modules of the transmit end device or the receive end device may be divided based on the foregoing method examples. For example, function modules may be divided based on functions, or two or more functions may be integrated into one processing module. The integrated module may be implemented in a form of hardware, or may be implemented in a form of a software functional module. It should be noted that, in embodiments of this application, module division is an example, and is merely logical function division. In actual implementation, another division manner may be used. An example in which function modules are divided based on functions is used below for description.

Figure 9:
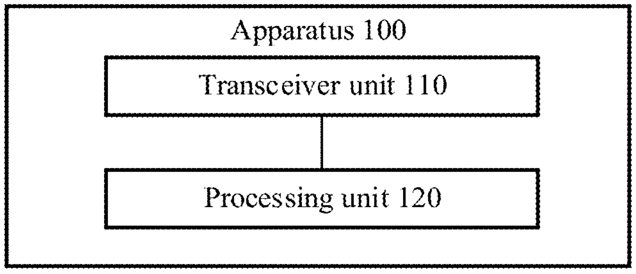
FIG. 9 is a schematic block diagram of a ranging apparatus according to this application.

FIG. 9 is a schematic block diagram of a ranging apparatus 100 according to an embodiment of this application. As shown in the figure, the apparatus 100 may include a transceiver unit 110 and a processing unit 120.

In a possible design, the ranging apparatus 100 may be the transmit end in the foregoing method embodiments, or may be a chip configured to implement a function of the transmit end in the foregoing method embodiments. It should be understood that the apparatus 100 may correspond to the transmit end in the method 300, the method 400, and the method 700 according to embodiments of this application, and the apparatus 100 may perform the steps corresponding to the transmit end in the method 300, the method 400, and the method 700 in embodiments of this application. It should be understood that a specific process in which the units perform the foregoing corresponding steps is described in detail in the foregoing method embodiments, and for brevity, details are not described herein.

Specifically, the transceiver unit is configured to receive a first ranging parameter. The first ranging parameter is received in an $N^{th}$ (where N is an integer greater than 0) time of ranging. The first ranging parameter includes a first ranging precision of a ranging signal and/or a first signal-to-noise ratio of the ranging signal. The processing unit is configured to determine a first ranging waveform based on the first ranging parameter. The transceiver unit is configured to send the first ranging waveform. The transceiver unit is configured to receive a second ranging parameter. The second ranging parameter is determined by the processing unit based on the first ranging waveform. The second ranging parameter includes a second ranging precision of the ranging signal and/or a second signal-to-noise ratio of the ranging signal. The second ranging precision is less than the first ranging precision. When a value of the second ranging parameter does not meet a threshold of a system, the processing unit is configured to perform an $(N+1)^{th}$ time of ranging. Alternatively, when a value of the second ranging parameter meets a threshold of a system, the processing unit is configured to end ranging.

In a possible design, the ranging apparatus 100 may be the receive end in the foregoing method embodiments, or may be a chip configured to implement a function of the receive end in the foregoing method embodiments. It should be understood that the apparatus 100 may correspond to the receive end in the method 300, the method 400, and the method 700 according to embodiments of this application, and the apparatus 100 may perform the steps corresponding to the receive end in the method 300, the method 400, and the method 700 in embodiments of this application. It should be understood that a specific process in which the units perform the foregoing corresponding steps is described in detail in the foregoing method embodiments, and for brevity, details are not described herein.

Specifically, the transceiver unit is configured to send a first ranging parameter. The first ranging parameter is sent in an $N^{th}$ (where N is an integer greater than 0) time of ranging. The first ranging parameter includes a first ranging precision of a ranging signal and/or a first signal-to-noise ratio of the ranging signal. The transceiver unit is configured to receive a first ranging waveform. The first ranging waveform is generated based on the first ranging parameter. The processing unit is configured to determine the second ranging parameter based on the first ranging waveform. The second ranging parameter includes a second ranging precision of the ranging signal and/or a second signal-to-noise ratio of the ranging signal. The second ranging precision is less than the first ranging precision. When a value of the second ranging parameter does not meet a threshold of a system, the processing unit is configured to perform an $(N+1)^{th}$ time of ranging. Alternatively, when a value of the second ranging parameter meets a threshold of a system, the processing unit is configured to end ranging.

Figure 10:
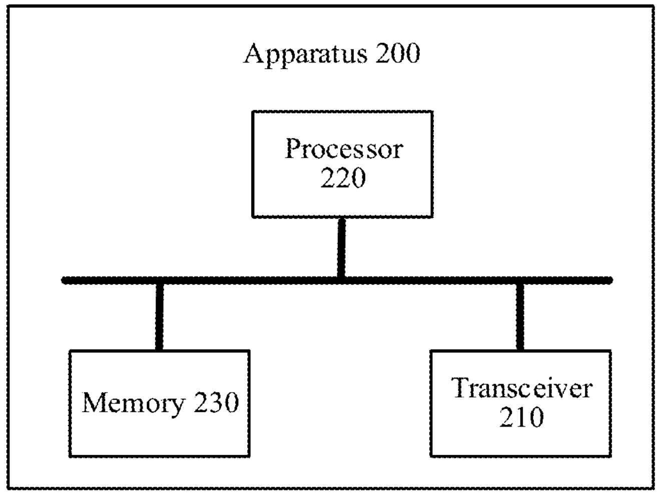
FIG. 10 is a schematic block diagram of a ranging apparatus according to this application.

FIG. 10 is a schematic block diagram of a ranging apparatus 200 according to an embodiment of this application. As shown in the figure, the apparatus 200 includes at least one processor 220. The processor 220 is coupled to a memory, and is configured to execute instructions stored in the memory, to send a signal and/or receive a signal. Optionally, the apparatus 200 further includes a memory 230, configured to store instructions. Optionally, the apparatus 200 further includes a transceiver 210, and the processor 220 controls the transceiver 210 to send a signal and/or receive a signal.

It should be understood that the processor 220 and the memory 230 may be combined into a processing apparatus, and the processor 220 is configured to execute program code stored in the memory 230 to implement the foregoing functions. In specific implementations, the memory 230 may alternatively be integrated into the processor 220, or be independent of the processor 220.

It should be further understood that the transceiver 210 may include a receiver (or referred to as a receiver device) and a transmitter (or referred to as a transmitter device). The transceiver may further include one or more antennas. The transceiver 210 may be a communication interface or an interface circuit.

Specifically, the transceiver 210 in the apparatus 200 may correspond to the transceiver unit 110 in the apparatus 100, and the processor 220 in the apparatus 200 may correspond to the processing unit 120 in the apparatus 100.

It should be understood that a specific process in which the transceiver and the processor perform the foregoing corresponding steps is described in detail in the foregoing method embodiments, and for brevity, details are not described herein.

In an implementation process, the steps of the foregoing methods may be completed by using an integrated logic circuit of hardware in the processor, or by using instructions in a form of software. The steps of the methods disclosed with reference to embodiments of this application may be directly performed and completed by a hardware processor, or may be performed and completed by using a combination of hardware in the processor and a software module. The software module may be located in a known storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor. To avoid repetition, details are not described herein again.

It should be noted that the processor in embodiments of this application may be an integrated circuit chip, and has a signal processing capability. In an implementation process, the steps in the foregoing method embodiments may be completed by using an integrated logic circuit of hardware in the processor, or by using instructions in a software form. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general purpose processor may be a microprocessor, or the processor may be any conventional processor, or the like. The steps of the methods disclosed with reference to embodiments of this application may be directly performed and completed by a hardware decoding processor, or may be performed and completed by using a combination of hardware and a software module in the decoding processor. The software module may be located in a known storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and the volatile memory is used as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and methods described in this specification includes but is not limited to these memories and any memory of another proper type.

According to the methods provided in embodiments of this application, this application further provides a computer program product. The computer program product stores computer program code. When the computer program code is run on a computer, the computer is enabled to perform the method in any embodiment of the method 300, the method 400, and the method 700 embodiments.

According to the methods provided in embodiments of this application, this application further provides a computer-readable medium. The computer-readable medium stores program code. When the program code is run on a computer, the computer is enabled to perform the method in any embodiment of the method 300, the method 400, and the method 700 embodiments.

According to the methods provided in embodiments of this application, this application further provides a system, including the foregoing apparatuses or devices.

All or some of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

The network side device and the terminal device in the foregoing apparatus embodiments correspond to the network side device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside in a process and/or a thread of execution, and the components may be located on one computer and/or distributed between two or more computers. In addition, these components may be executed from various computer-readable media that store various data structures. For example, the components may communicate by using a local and/or remote process, and based on a signal having one or more data packets (for example, data from two components interacting with another component in a local system, a distributed system, and/or across a network such as an internet interacting with other systems by using a signal).

A person of ordinary skill in the art may be aware that the units and algorithm steps in the examples described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each specific application. However, it should not be considered that this implementation goes beyond the scope of this application.

It may be clearly understood by a person skilled in the art that, for the purpose of convenient and brief description, for a specific working process of the foregoing system, apparatuses, and units, refer to a corresponding process in the foregoing method embodiments, and details are not described herein again.

In embodiments provided in this application, it should be understood that the disclosed system, apparatuses and methods may be implemented in other ways. For example, the described apparatus embodiments are merely examples. For example, division into the units is merely logical function division and there may be other divisions in actual implementation. For example, a plurality of units or components may be combined or integrated into another system, or some features may be ignored or not performed. In addition, the displayed or discussed mutual couplings or direct couplings or communication connections may be through some interfaces, and indirect couplings or communication connections of the apparatuses or units may be in an electrical, a mechanical, or another form.

The units described as separate components may or may not be physically separate, and components displayed as units may or may not be physical units, that is, may be located in one place, or may be distributed on a plurality of network units. Some or all of the units may be selected based on an actual requirement to achieve the objectives of the solutions in embodiments.

In addition, functional units in embodiments of this application may be integrated into one processing unit, or each unit may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes media that can store program code, such as a USB flash drive, a removable hard disk, a read-only memory (ROM), a random access memory (RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A ranging method, comprising:

receiving, by a transmit end, a first ranging parameter from a receive end, wherein the first ranging parameter is received in an Nth time of ranging, and the first ranging parameter comprises at least one of a first ranging precision of a ranging signal and/or a first signal-to-noise ratio of the ranging signal;

determining, by the transmit end, a first ranging waveform based on the first ranging parameter;

sending, by the transmit end, the first ranging waveform to the receive end;

receiving, by the transmit end, a second ranging parameter from the receive end, wherein the second ranging parameter is determined based on the first ranging waveform, and the second ranging parameter comprises at least one of a second ranging precision of the ranging signal and/or a second signal-to-noise ratio of the ranging signal, wherein a value of the second ranging precision is less than a value of the first ranging precision; and when a value of the second ranging parameter does not meet a threshold of a system, performing, by the transmit end, an (N+1)th time of ranging, or when a value of the second ranging parameter meets a threshold of a system, ending, by the transmit end, ranging, wherein N is an integer greater than 0.

2. The ranging method according to claim 1, wherein determining, by the transmit end, the first ranging waveform comprises:

determining, by the transmit end, a first distance of the ranging signal based on the first ranging parameter; and generating, by the transmit end, the first ranging waveform based on a type of the ranging signal and the first distance.

3. The ranging method according to claim 2, wherein when the first ranging parameter is the first signal-to-noise ratio, determining, by the transmit end, the first distance of the ranging signal comprises:

determining, by the transmit end, the first ranging precision based on the first signal-to-noise ratio; and determining, by the transmit end, the first distance of the ranging signal based on the first ranging precision.

4. The ranging method according to claim 1, wherein when the second ranging parameter is the second signal-to-noise ratio, the method further comprises:

determining, by the transmit end, the second ranging precision based on the second signal-to-noise ratio; and when a value of the second ranging precision is greater than a first threshold, performing, by the transmit end, the $(N+1)^{th}$ time of ranging, or when a value of the second ranging precision is less than or equal to the first threshold, ending, by the transmit end, the ranging.

5. The ranging method according to claim 1, wherein the method further comprises:

determining, by the transmit end, a second distance of the ranging signal, wherein no distance ambiguity point exists in the second distance within a ranging range supported by the system;

generating, by the transmit end, a second ranging waveform based on a type of the ranging signal and the second distance; and sending, by the transmit end, the second ranging waveform to the receive end, wherein the first ranging parameter is determined based on the second ranging waveform, wherein the second distance is greater than the first distance.

6. A ranging method, comprising:

sending, by a receive end, a first ranging parameter to a transmit end, wherein the first ranging parameter is sent in an Nth time of ranging, and the first ranging parameter comprises at least one of a first ranging precision of a ranging signal and/or a first signal-to-noise ratio of the ranging signal;

receiving, by the receive end, a first ranging waveform from the transmit end, wherein the first ranging waveform is generated based on the first ranging parameter;

determining, by the receive end, a second ranging parameter based on the first ranging waveform, wherein the second ranging parameter comprises at least one of a second ranging precision of the ranging signal and/or a second signal-to-noise ratio of the ranging signal, and a value of the second ranging precision is less than a value of the first ranging precision; and when a value of the second ranging parameter does not meet a threshold of a system, performing, by the receive end, an (N+1)th time of ranging, or when a value of the second ranging parameter meets a threshold of a system, ending, by the receive end, ranging, wherein N is an integer greater than 0.

7. The ranging method according to claim 6, wherein that the first ranging waveform is generated based on the first ranging parameter comprises:

the first ranging waveform is generated based on a type of the ranging signal and a first distance, and the first distance is generated based on the first ranging parameter.

8. The ranging method according to claim 7, wherein when the first ranging parameter is the first signal-to-noise ratio, that the first distance is generated based on the first ranging parameter comprises:

the first distance is generated based on the first ranging precision, and the first ranging precision is generated based on the first signal-to-noise ratio.

9. The method according to claim 6, wherein when the second ranging parameter is the second signal-to-noise ratio, the method further comprises:

determining, by the receive end, the second ranging precision based on the second signal-to-noise ratio; and when a value of the second ranging precision is greater than a first threshold, performing, by the receive end, the $(N+1)^{th}$ time of ranging, or when a value of the second ranging precision is less than or equal to the first threshold, ending, by the receive end, the ranging.

10. The ranging method according to claim 6, wherein the method further comprises:

receiving, by the receive end, a second ranging waveform from the transmit end, wherein the second ranging waveform is generated based on a type of the ranging signal and a second distance, wherein no distance ambiguity point exists in the second distance within a ranging range supported by the system, and the second distance is greater than the first distance;

determining, by the receive end, the first ranging parameter based on the second ranging waveform; and when a value of the first ranging parameter does not meet the threshold of the system, performing, by the receive end, the $(N+1)^{th}$ time of ranging, or when the value of the first ranging parameter meets the threshold of the system, ending, by the receive end, the ranging.

11. A ranging apparatus, comprising:

at least one processor, wherein the at least one processor is configured to execute a computer program stored in a memory, to enable the ranging apparatus to:

receive a first ranging parameter from a receive end, wherein the first ranging parameter is received in an Nth time of ranging, and the first ranging parameter comprises at least one of a first ranging precision of a ranging signal and/or a first signal-to-noise ratio of the ranging signal;

determine a first ranging waveform based on the first ranging parameter;

send the first ranging waveform to the receive end;

receive a second ranging parameter from the receive end, wherein the second ranging parameter is determined based on the first ranging waveform, and the second ranging parameter comprises at least one of a second ranging precision of the ranging signal and/or a second signal-to-noise ratio of the ranging signal, wherein a value of the second ranging precision is less than a value of the first ranging precision; and when a value of the second ranging parameter does not meet a threshold of a system, perform an (N+1)* time of ranging, or when a value of the second ranging parameter meets the threshold of the system, end ranging, wherein N is an integer greater than 0.

12. The ranging apparatus according to claim 11, wherein determining the first ranging waveform comprises:

determining a first distance of the ranging signal based on the first ranging parameter; and generating the first ranging waveform based on a type of the ranging signal and the first distance.

13. The ranging apparatus according to claim 12, wherein when the first ranging parameter is the first signal-to-noise ratio, determining the first distance of the ranging signal based on the first ranging parameter comprises:

determining the first ranging precision based on the first signal-to-noise ratio; and determining the first distance of the ranging signal based on the first ranging precision.

14. The ranging apparatus according to claim 11, wherein when the second ranging parameter is the second signal-to-noise ratio, the ranging apparatus is further enabled to:

determine the second ranging precision based on the second signal-to-noise ratio; and when a value of the second ranging precision is greater than a first threshold, perform the $(N+1)^{th}$ time of ranging, or when the value of the second ranging precision is less than or equal to the first threshold, end the ranging.

15. The ranging apparatus according to claim 11, wherein the ranging apparatus is further enabled to:

determine a second distance of the ranging signal, wherein no distance ambiguity point exists in the second distance within a ranging range supported by the system;

generate a second ranging waveform based on the type of the ranging signal and the second distance; and send the second ranging waveform to the receive end, wherein the first ranging parameter is determined based on the second ranging waveform, wherein the second distance is greater than the first distance.

16. The method according to claim 1, wherein a quantity of subcarriers of the ranging signal is 2 raised to the power of 3 or more, a quantity of zero power subcarriers of the ranging signal is less than or equal to two less than the quantity of subcarriers of the ranging signal and greater than or equal to half of the quantity of subcarriers of the ranging signal, and a quantity of non-zero power subcarriers of the ranging signal is greater than or equal to two and less than or equal to half of the quantity of subcarriers of the ranging signal.

17. The method according to claim 6, wherein a quantity of subcarriers of the ranging signal is 2 raised to the power of 3 or more, a quantity of zero power subcarriers of the ranging signal is less than or equal to two less than the quantity of subcarriers of the ranging signal and greater than or equal to half of the quantity of subcarriers of the ranging signal, and a quantity of non-zero power subcarriers of the ranging signal is greater than or equal to two and less than or equal to half of the quantity of subcarriers of the ranging signal.

18. The apparatus according to claim 11, wherein a quantity of subcarriers of the ranging signal is 2 raised to the power of 3 or more, a quantity of zero power subcarriers of the ranging signal is less than or equal to two less than the quantity of subcarriers of the ranging signal and greater than or equal to half of the quantity of subcarriers of the ranging signal, and a quantity of non-zero power subcarriers of the ranging signal is greater than or equal to two and less than or equal to half of the quantity of subcarriers of the ranging signal.

* * * * *